Oct. 13, 1936.  W. J. BAUER  2,057,509

METHOD OF AND APPARATUS FOR APPLYING STARCH

Filed March 1, 1935  4 Sheets-Sheet 1

INVENTOR.
WILLIAM J. BAUER

BY

ATTORNEY.

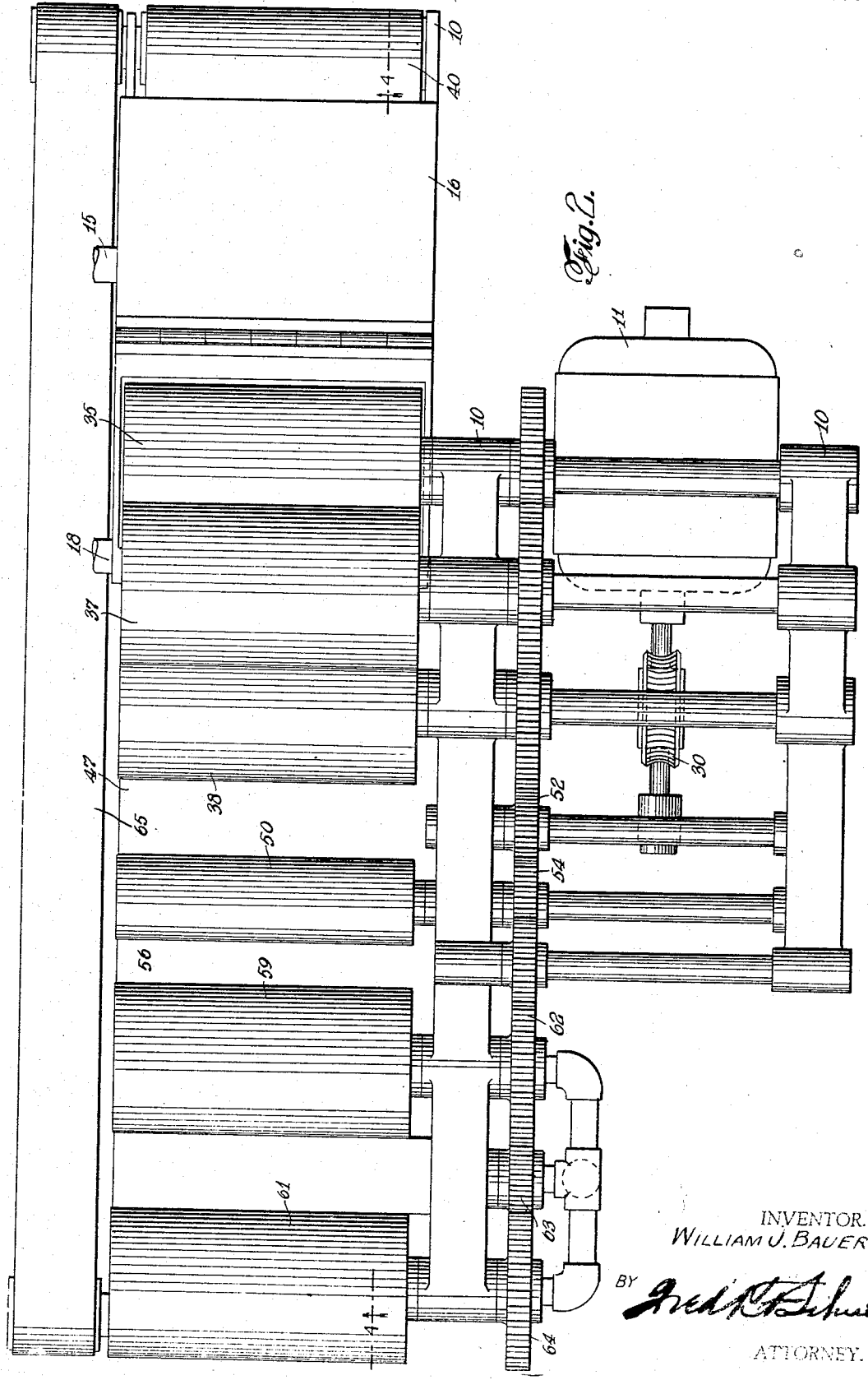

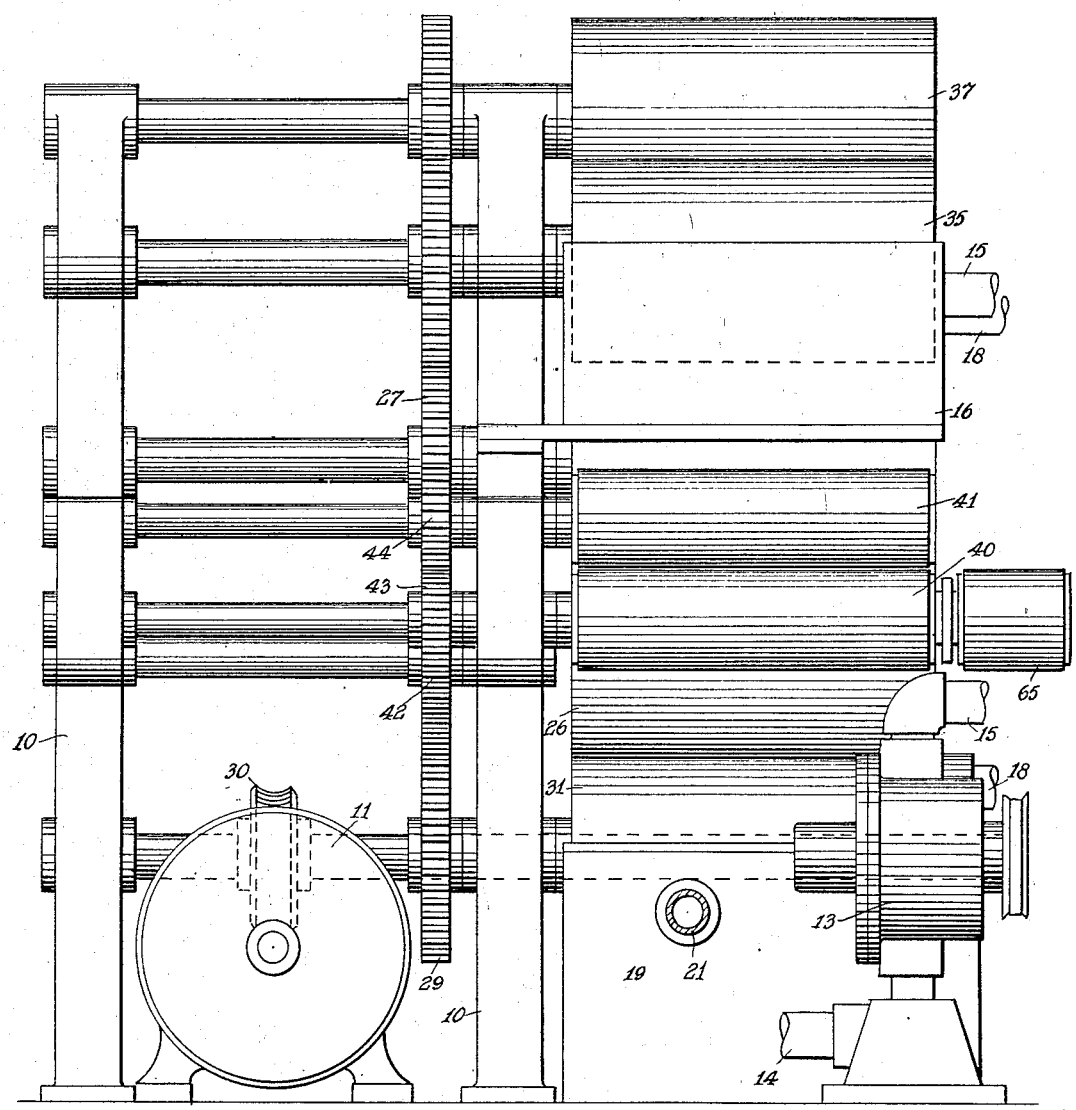

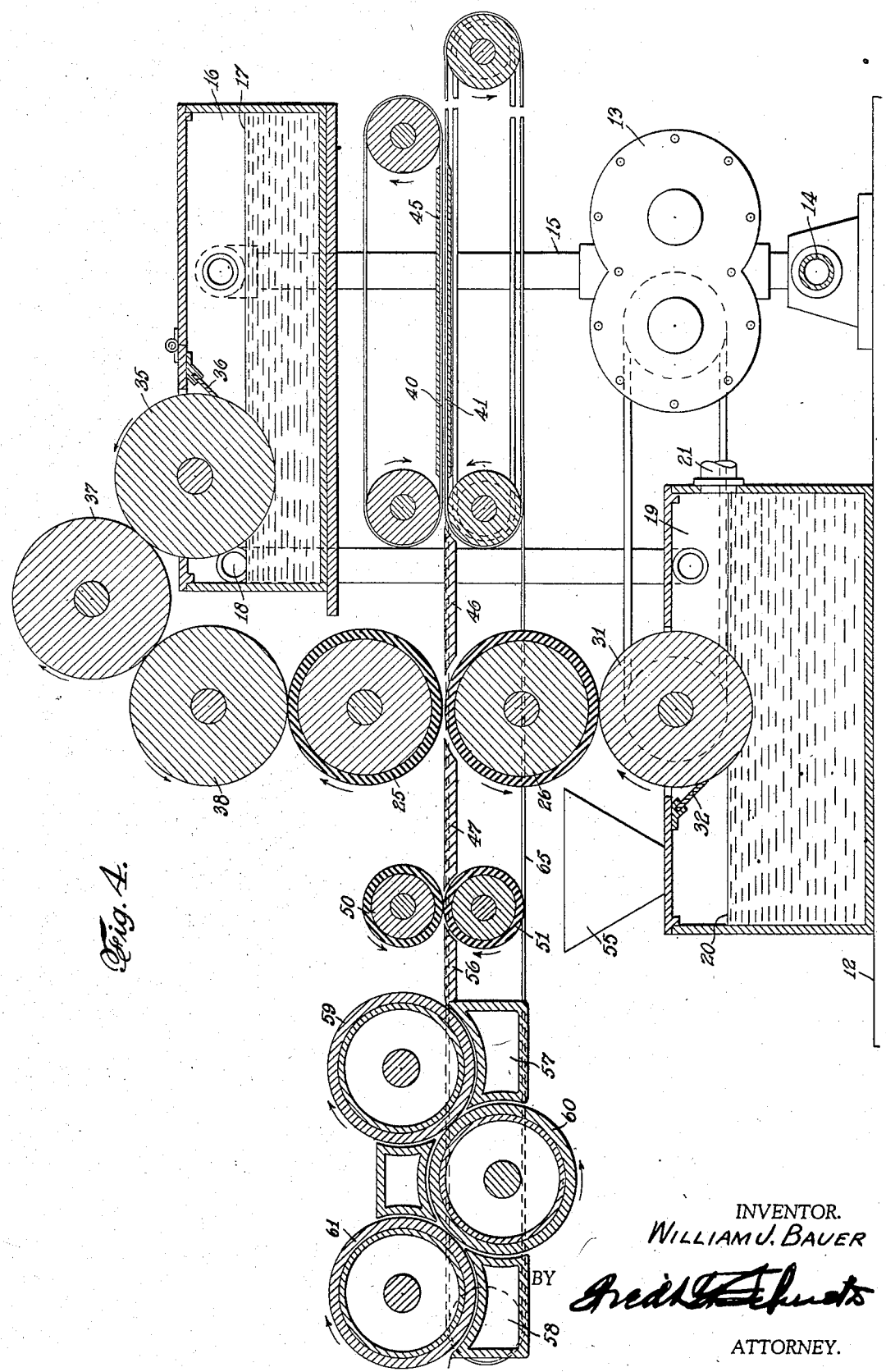

Patented Oct. 13, 1936

2,057,509

UNITED STATES PATENT OFFICE 2,057,509

METHOD OF AND APPARATUS FOR APPLYING STARCH

William J. Bauer, New York, N. Y., assignor to Laundry Equipment Corporation, Brooklyn, N. Y., a corporation of New York Application March 1, 1935, Serial No. 8,823

5 Claims. (Cl. 38—149)

The invention relates to laundry machinery and more especially to a method of and apparatus for starching articles such as collars, cuffs, shirt fronts and collar bands, etc.

It has for an object the thorough impregnation of articles of the aforesaid nature with starch solution by application of the same simultaneously thereto upon opposite sides, and the provision of apparatus whereby the goods may be fed between rolls having resilient peripheries for applying the starch thereto.

A further object of the invention resides in the provision of circulating means for agitating the solution and insuring always its proper consistency for application to the material.

Another object of the invention is to associate with such machine ironing rolls for receiving the starched goods automatically after completion of the starching thereof and effecting the ironing of the same thereby.

A still further object of the invention resides in the provision of wringer means in association with the applying means to remove superfluous starch from the goods prior to their introduction to the ironing portions of the apparatus; and, also, the provision of means to collect drip from such wringer means and to return the same to the solution-circulating system.

The invention has for another object the provision of a movable supporting element located adjacently the goods in progress through the apparatus to support temporarily any portion thereof not being operated on; also, to effect from a common driving element actuation of all of the mechanism for the different operations involved.

In carrying out the invention, suitable feed means are provided for advancing the goods to be starched between two rotating and juxtaposed starch-applying rolls, the goods delivered therefrom being received, preferably, by a wringer which removes any superfluous starch and then delivers the starched goods, if desired, to suitable ironing rolls.

Provision is made for securing under pressure the application of the starch solution to both sides of the goods passing through the pair of starch-applying rolls, which are continuously rotated to secure not only a uniform application of the starch thereto but to advance the goods between said rolls and to present them for further operations thereon. To this end, intermediate solution-carrying rolls are designed to be rotated between solution-containing tanks, and the said applying rolls are arranged to contact with the peripheries thereof which convey the starch. The arrangement is such, moreover, that the starch solution is first delivered to a supply tank at a level above the pair of starch-applying rolls and maintained therein at a predetermined level through an overflow delivering into a second tank at a level below the said applying rolls. The solution level in this latter tank is also maintained through an overflow which returns any surplus to the source of supply and from which the said solution is initially suitably pumped to the higher tank. Suitable pick-up rolls are rotatably mounted in the respective tanks and are engaged by scraping blades to maintain a predetermined uniform thickness of coating. Any drip from the wringer is caught by a suitable trough discharging into the lower supply tank.

The nature of the invention, however, will best be understood when described in connection with the accompanying drawings, in which:

Fig. 2 is a plan view thereof.

Fig. 3 is an end elevation of the feed side of the machine.

Fig. 4 is a longitudinal section through the machine taken on the line 4—4, Fig. 2 of the drawings, and looking in the direction of the arrows.

Figure 1:
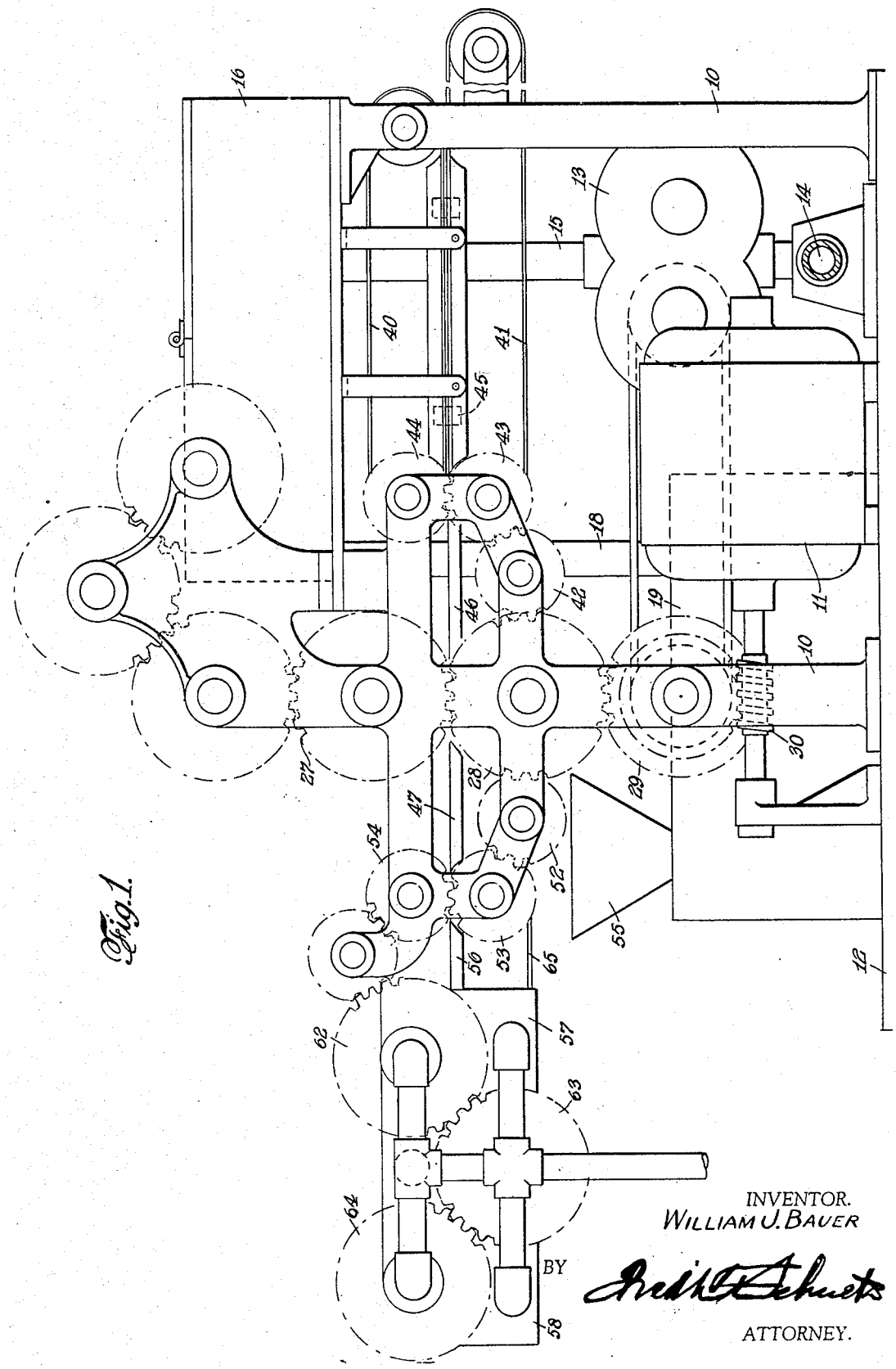
Fig. 1 shows in side elevation the novel starch-applying machine, with ironing apparatus associated therewith.

Referring to the drawings, 10 designates a suitable framing for supporting the apparatus hereinafter described, there being associated with the framing an electric motor 11 or like driving means for operating the entire mechanism. For example, motor 11 is located at the base of the apparatus upon the supporting base plate 12 or flooring and upon which the mechanism as a whole may be carried. Pumping mechanism 13 is likewise mounted upon the base plate 12 and is designed to supply from a suitable storage source (not shown), as through the supply pipe 14, the starch solution utilized in the carrying out of the starching operation. This pump delivers, as through the pipe 15, the starch solution to a trough or supply tank 16 located at the upper portion of the apparatus; and the level of the starch solution 17 therein is maintained by an overflow pipe 18. The latter, in turn, delivers through said pipe solution from the tank 16 to a further tank 19 positioned below tank 16, for example, on the base plate 12. The level of the solution 20 therein is maintained by an overflow pipe 21 designed to discharge surplus solution to the storage reservoir (not shown) from which it is recirculated through the supply tanks hereinbefore described. By the foregoing arrangement the said solution after being elevated and agitated by the pump is returned by gravity and there is maintained at all times within the respective tanks the desired level for supplying the proper quantity of starch solution to the starch-applying mechanism, located therebetween and hereinafter described.

This mechanism includes a pair of cooperating rolls 25 and 26 coated with resilient material as rubber and located, for example, one above the other, and being rotated continuously in opposite directions from the worm and worm gear transmission 30 of motor 11, as through gearing comprising the gears 27, 28, and 29. Intermediate rolls serve to transport the solution from the respective tanks 16 and 19 to these starch-applying rolls 25 and 26.

Thus, a roll 31 driven by the gear wheel 29 is designed to dip partly into the starch solution 20, the periphery of said roll contacting with the periphery of the roll 26 in contact therewith to thereby transport the solution from said tank 19 to the lower of the cooperating starch-applying rolls. A scraper blade 32 attached to the tank cover serves to remove surplus solution from the roll 31 and provides for uniform distribution of the solution over roll 26.

Similarly, a roll 35 dips into the solution 17 of the upper tank 16, with scraper blade 36 bearing upon its periphery to remove therefrom surplus solution. In this instance, however, an intermediate roll 37 has its periphery contacting the periphery of roll 35 as well as the periphery of a further roll 38 whose periphery contacts the upper roll 25 of the cooperating starch-applying rolls, so that starch solution is uniformly and continuously provided thereover as well as over the lowermost roll 26.

The aforesaid cooperating starch-applying rolls 25 and 26 are designed to receive between their juxtaposed peripheries the goods to be starched; and the same in a moistened state may conveniently be directed thereto between a pair of endless travelling belts 40 and 41 which are driven from the motor 11 through suitable gearing 42, 43, and 44, the gear 42 engaging the gear 28 of the driving train for roller 26. A yieldable clamp 45 serves to retain the goods in place between the belt surfaces during their advance.

The goods after leaving the far end of this belt conveyer are received by an intermediate support or table 46 and then continued between the cooperating starch-applying rolls 25 and 26. As these ride over the goods and continue the progression of the same, starch from their respective peripheries will be applied under pressure simultaneously to the opposite sides of the goods so that a thorough impregnation with the starch is effected from both sides of the material. The goods are then received upon a delivery table 47.

If desired, they may then be removed; but it is preferred to first pass them through a wringer mechanism comprising the rolls 50 and 51, which receive the goods from table 47, passing the same therethrough under the rotation derived from the motor 11 through gearing 52, 53, and 54 of which gear 52 is in mesh with the gear 28 of the train-drive for roll 26. Drip from the wringer is caught by a hopper 55 located immediately beneath the wringer device and discharging into the trough 19.

Should it be desired to effect immediate ironing of the goods leaving this wringer, the same as they are received by a table 56 beyond said wringer may be passed to suitable ironing means, for example, comprising the steam chests 57 and 58 and well-known cooperating cloth-covered rolls 59, 60, and 61. These various rolls may be driven from the motor 11 through a train of gearing 62, 63, and 64, of which the gear 62 is driven from gear 54 of the wringer train.

As a result of this mechanical application of the starch solution simultaneously to opposite sides of the articles as they pass between the two rolls 25 and 26, not only do they become thoroughly impregnated with the starch solution, but this material is applied uniformly throughout the articles, or portions desired to be starched, providing for a uniform finish in the ironing which is not attainable by the usual manual starching processes.

Throughout the progression of the said goods as aforesaid, they may be further supported over their portions not desired to receive the starching, as in the provision of an endless carrier, for example a belt 65, located adjacently the different portions of the apparatus along one side thereof and substantially in the plane of belts 40, 41 and the tables 46, 47, and 56. This carrier is driven from the driving mechanism of the said belts 40, 41 so as to travel at a like velocity.

I claim:

1. In a starch-applying apparatus: a pair of cooperating starching rolls through which the articles to be starched are designed to pass, means to rotate the starch-applying rolls, means to feed the articles to said rolls, two tanks for starch solution, two rolls adapted respectively to dip therein and to be rotated by said rotating means, means for transferring starch solution from the dipping rolls to the peripheries of the respective starch-applying rolls, one tank being at a level above the cooperating peripheries of the starch-applying rolls and the other below the same, and means to maintain the levels of the starch solution in the tanks and including respective overflow pipes and the pipe from the higher level tank discharging into the lower tank.

2. In a starch-applying apparatus: a pair of cooperating starching rolls through which the articles to be starched are designed to pass, means to rotate the starch-applying rolls, means to feed the articles to said rolls, means to apply starch solution to the peripheries of both of the said starch-applying rolls, and an advancing supplementary carrier means at one side of said starch-applying roll for supporting a portion of the advancing articles.

3. In a starch-applying apparatus: a pair of cooperating starching rolls through which the articles to be starched are designed to pass, means to rotate the starch-applying rolls, means to feed the articles to said rolls, means to apply starch solution to the peripheries of both of the said starch-applying rolls, and supplementary carrier means for supporting a portion of the advancing articles, the feeding and carrier means being driven from the said means for rotating the starch-applying means and at like velocities.

4. In a starch-applying apparatus: a pair of cooperating starching rolls through which an article to be starched is designed to pass, said rolls being open at one end to receive edgewise the said articles, means to feed an article to said rolls to present only a portion thereof between the same, and supplementary moving carrier means adjacently disposed thereto for supporting the remainder of an advancing article.

5. In a starch-applying apparatus: a pair of cooperating starching rolls through which an article to be starched is designed to pass, said rolls being open at one end to receive edgewise the said articles, means to feed an article to said rolls to present only a portion thereof between the same, supplementary carrier means adjacently disposed thereto for supporting the remainder of an advancing article, and means to advance the feeding means and the supplementary carrier means at a like rate.

WILLIAM J. BAUER.